United States Patent
Sigl et al.

(10) Patent No.: US 9,169,911 B2
(45) Date of Patent: Oct. 27, 2015

(54) DRIVE DEVICE FOR THE ROAD WHEELS OF A VEHICLE

(71) Applicants: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(72) Inventors: Horst Sigl, Passau (DE); Paul Lenz, Waldkirchen (DE); Peter Haselberger, Mauth (DE); Rudolf Neumüller, Buechlberg (DE); Klaus Alesch, Untergriesbach (DE); Alexander Enderl, Vilshofen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 14/161,920

(22) Filed: Jan. 23, 2014

(65) Prior Publication Data
US 2014/0206490 A1    Jul. 24, 2014

(30) Foreign Application Priority Data
Jan. 24, 2013    (DE) .......................... 10 2013 201 089

(51) Int. Cl.
*F16H 48/42*    (2012.01)
*F16H 48/38*    (2012.01)
*B60K 17/04*    (2006.01)

(52) U.S. Cl.
CPC ................ *F16H 48/38* (2013.01); *F16H 48/42* (2013.01); *B60K 17/046* (2013.01); *F16H 2048/423* (2013.01)

(58) Field of Classification Search
USPC .................................................. 384/455, 622
See application file for complete search history.

(56) References Cited

U.S. PATENT DOCUMENTS

| | | | |
|---|---|---|---|
| 1,023,683 A | 4/1912 | Royce | |
| 1,506,037 A | 8/1924 | Alden et al. | |
| 1,506,365 A | 8/1924 | Domizi | |
| 1,613,566 A | 1/1927 | Melanowski | |
| 2,061,009 A | 11/1936 | Rothrock | |
| 2,118,760 A | 5/1938 | Ernst | |
| 2,270,567 A | 1/1942 | Slider | |
| 2,546,969 A | 4/1951 | Buckendale | |
| 2,659,246 A | 11/1953 | Norelius | |
| 3,006,700 A | 10/1961 | Hoffmann | |
| 3,260,132 A | 7/1966 | West et al. | |
| 4,004,471 A * | 1/1977 | Keske | 475/251 |
| 4,733,578 A | 3/1988 | Glaze et al. | |
| 6,357,927 B1 | 3/2002 | Myers et al. | |
| 6,554,733 B2 * | 4/2003 | Niebauer | 475/230 |
| 6,695,739 B2 * | 2/2004 | Fett | 475/230 |
| 6,814,683 B2 * | 11/2004 | Krzesicki et al. | 475/230 |
| 7,108,428 B2 * | 9/2006 | Ason et al. | 384/583 |
| 7,722,495 B1 * | 5/2010 | Stanley | 475/220 |
| 7,775,929 B2 * | 8/2010 | Waksmundzki | 475/235 |

(Continued)

*Primary Examiner* — Justin Holmes
(74) *Attorney, Agent, or Firm* — Cozen O'Connor

(57) ABSTRACT

A drive device for the road wheels of a vehicle includes a stationary housing in which a rotatably drivable differential housing having an axle differential gear unit is rotatably mounted by differential bearings, at least one driveshaft being rotatably drivable by the differential housing. At least one driving gear wheel is arranged on the at least one driveshaft so as to be fixed with respect to rotation relative to the latter. The at least one driving gear wheel meshingly engage by oppositely directed helical teeth with at least one driven gear wheel for driving road wheels of the vehicle and generating axial forces directed toward the center of the axle differential gear unit. At least one thrust bearing arrangement for supporting these axial forces is in turn supported at a structural component part of the drive device.

6 Claims, 1 Drawing Sheet

(56) References Cited

U.S. PATENT DOCUMENTS

| | | |
|---|---|---|
| 8,109,000 B2 * | 2/2012 | Zalanca et al. ............... 29/897.2 |
| 2002/0031289 A1 | 3/2002 | Kenney, Jr. |
| 2002/0183156 A1 | 12/2002 | Gradu et al. |
| 2009/0019966 A1 | 1/2009 | Valente |
| 2010/0081535 A1 | 4/2010 | Gutsmiedl |
| 2010/0151983 A1 | 6/2010 | Ziech et al. |
| 2011/0075960 A1 * | 3/2011 | White et al. .................. 384/606 |
| 2012/0295753 A1 | 11/2012 | Kwon |

* cited by examiner

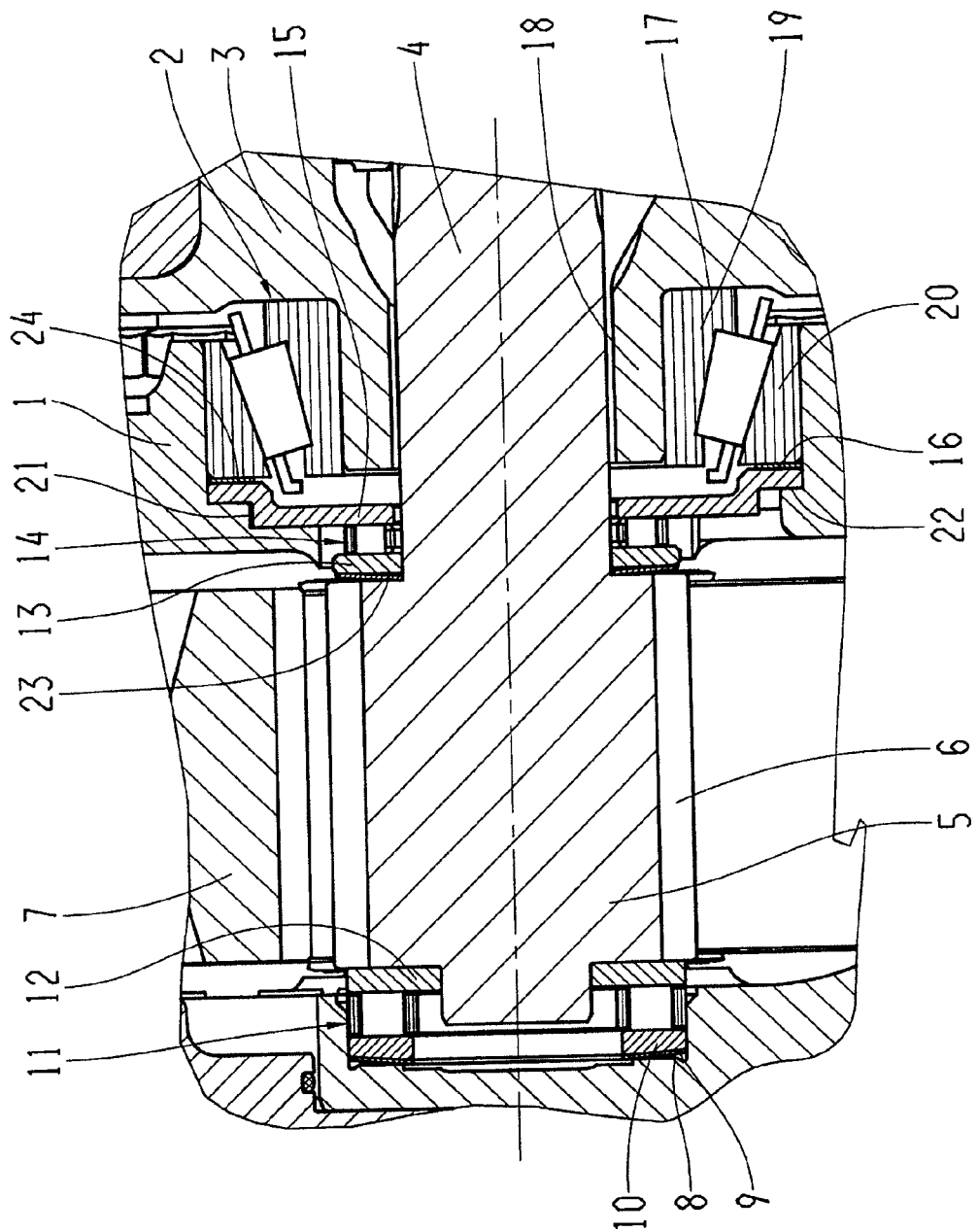

DRIVE DEVICE FOR THE ROAD WHEELS OF A VEHICLE

BACKGROUND OF THE INVENTION

1. Field of the Invention

The invention is directed to a drive device for the road wheels of a vehicle with a stationary housing in which a rotatably drivable differential housing with an axle differential gear unit is rotatably mounted by differential bearings, typically two driveshafts being rotatably drivable by the differential housing, a driving gear wheel being arranged on the two driveshafts in each instance so as to be fixed with respect to rotation relative to the latter. The driving gear wheels meshingly engage by oppositely directed helical teeth with driven gear wheels for driving road wheels of the vehicle and generate axial forces directed toward the center of the axle differential gear unit, with thrust bearing arrangements for supporting these axial forces, these thrust bearing arrangements being in turn supported at a structural component part of the drive device.

2. Description of the Related Art

In a drive device of the type mentioned above, it is known to support the axial forces of the driving gear wheels directed toward the center of the axle differential at parts of the housing that project radially between the driving wheels and the differential housing until closely adjacent to the driveshafts and have an axial guide and a radial supporting surface for the thrust bearing arrangements.

If the helix angle of the helical toothing is to be large so that higher outputs can be transmitted, there will also be an increase in the axial forces generated by the driving gear wheels and directed to the center of the axle differential and which must be supported via the thrust bearing arrangements at the parts of the housing. This requires a larger bearing arrangement and a more stable design of the parts of the housing and, therefore, a larger installation space. However, enlargement in the axial direction is impossible because the installation space is limited by the rims of the road wheels, by the tire clearance for the latter and by the differential bearings.

SUMMARY OF THE INVENTION

Therefore, it is an object of the invention to provide a drive device of the type mentioned above that is constructed in a simple manner and that allows the increased axial forces generated by the driving wheels to be supported without an increased installation space requirement.

This object is met, according to a first aspect of the invention, in that the differential bearings are radial/axial rolling bearings with an inner ring and an outer ring, the inner ring thereof being arranged on the differential housing and supported axially with respect to the center of the axle differential gear unit at a first radial supporting surface of the differential housing, wherein the thrust bearing arrangement is supported axially with respect to the driveshaft at a second supporting surface on the side of the outer ring facing the driving gear wheel, and wherein the outer ring of the differential bearing is supported by its side remote of the differential housing axially at a third supporting surface of the housing.

In one aspect, the radial/axial rolling bearing is a tapered rolling bearing.

In this way, the axial space between the driving gear wheel and differential housing is available in its entirety for the bearing arrangement so that the latter can be larger and, therefore, configured in a more suitable manner for higher axial forces without an increased installation space requirement.

Further, a larger helix angle of the helical toothing of the driving gear wheels benefits noise behavior and reduces gear tooth friction loss.

In order to transmit high axial forces, in one aspect, the thrust bearing arrangement can have an annular shaft disk that axially contacts the driving gear wheel and an annular housing disk that axially contacts the second supporting surface of the outer ring of the differential bearing. The annular shaft disk and annular housing disk surround the at least one driveshaft and an axial rolling bearing is arranged between them, wherein the housing disk extends radially outward past the axial rolling bearing, and the outer ring of the differential bearing is supported at the third supporting surface of the housing axially by the housing disk.

To prevent a tilting of the housing disk, in one aspect, the housing disk can be axially guided in a cup-shaped recess of the housing, the base of this cup-shaped recess forming the third supporting surface.

If the cup-shaped recess is a stepped recess whose diameter decreases in a stepped manner in the region of its base and if the housing disk is formed in a stepped manner in its radially outer region corresponding to the region of the base of the cup-shaped recess, the outer ring of the differential bearing is supported axially at the third supporting surface of the housing by the housing disk. In this way, a large axial guiding length of the housing disk at the housing is achieved and collision between the housing disk and other parts of the differential bearing is reliably prevented.

For purposes of exact axial positioning of the differential bearing with respect to the housing, in one aspect, the outer ring of each differential bearing can axially contact the housing disk by its second supporting surface via a spacer disk of determined thickness.

In one aspect, an axially pre-loaded first spring element can be arranged between the driving gear wheel and the shaft disk.

The axially pre-loaded first spring element ensures that the housing disk and the shaft disk are always pre-loaded against the rolling elements of the axial rolling bearing. This prevents an impact when the play between these parts is overcome when the driveshaft changes rotational direction.

By virtue of the fact that the housing now need no longer extend to a point closely adjacent to the driveshaft for receiving and supporting the bearing arrangements, the driveshafts can be formed integrally with driving gear wheels with which they are associated, and the driveshafts formed integrally with the driving gear wheels can be mounted from the differential side, so as to facilitate assembly.

To pre-load the bearings, the driving gear wheel is loaded axially toward the center of the axle differential gear unit in a simple manner by a second spring element, which is supported at the housing.

In a simple construction, the first spring element and/or the second spring element can be plate springs.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

An exemplary embodiment of the invention is shown in the drawing and is described more fully in the following. In the drawing:

The FIGURE shows a section of a drive device for the road wheels of a vehicle.

DETAILED DESCRIPTION OF THE PRESENTLY PREFERRED EMBODIMENTS

As seen in the FIGURE, a rotatably drivable differential housing 3 of an axle differential gear unit, not shown, is rotatably mounted in a housing 1 by two differential bearings 2, one of which is shown.

Two driveshafts 4 are rotatably drivable in a diametrically opposed manner by the axle differential gear unit. The section illustrated in the FIGURE shows the area of one of these driveshafts 4.

At its end remote of the axle differential gear unit, the driveshaft 4 is formed integral with a driving gear wheel 5 having a helical toothing 6. The driving gear wheel 5 is in meshing engagement with a driven wheel 7 such that a road wheel (not shown) of a vehicle can be driven in rotation.

The housing 1 encloses the end of the driveshaft 4 having the driving gear wheel 5. Supported on the base of a coaxial recess 8 of the housing 1 is a second plate spring 9, which pre-loads the driving gear wheel 5 and the driveshaft 4 in direction of the differential housing 3 via a running disk 10 and a first axial cylindrical rolling bearing 11 and a first shaft disk 12.

The driving gear wheel 5 is supported on the side facing the differential housing 3 by—in axially successive arrangement—a first plate spring 23, a shaft disk 13, a rolling bearing formed as a second axial cylindrical rolling bearing 14 and a housing disk 15.

The differential housing 3 has a tubular elongation 18, which is directed to the driving gear wheel 5. The inner ring 19 of the one differential bearing 2 formed as a tapered roller bearing is arranged on the radially circumferential lateral surface of the tubular elongation 18. The inner ring 19 contacts a radial supporting surface 17 of the differential housing 3 axially.

The outer ring 20 of the differential bearing 2 is inserted into the large step of a cup-shaped recess 21 in the housing 1, the diameter of which cup-shaped recess 21 decreases in a stepped manner in the region of its base. The housing disk 15 projects radially past the axial rolling bearing 14 of the thrust bearing arrangement and is formed in its radially outer region in a stepped manner corresponding to the stepped construction of the cup-shaped recess 21 and is axially displaceably supported at the step wall of the cup-shaped recess 21.

The outer ring 20 of the differential bearing 2 is supported by its side remote of the differential housing 3, which side forms a radial second supporting surface 24, axially via a spacer disk 16 at the outer ring of the base of the cup-shaped recess 21, which base forms a third supporting surface 22.

When the driveshaft 4 is driven in rotation, axial forces directed to the center of the axle differential gear unit are generated on the driveshaft 4 by the driving gear wheel 5 owing to its helical toothing 6. These axial forces are supported at the annular radial second supporting surface 24 of the outer ring 20 of the differential bearing 2 via the first plate spring 23 and the thrust bearing arrangement comprising second shaft disk 13, second axial cylindrical rolling bearing 14 and housing disk 15 and are supported at the first supporting surface 17 of the differential housing 3 via differential bearing 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device, the drive device comprising:
   a stationary housing (1);
   a rotatably drivable differential housing (3), the rotatably drivable differential housing (3) being rotatably mounted in the stationary housing (1) by differential bearings (2);
   at least one driveshaft (4) rotatably drivable by the rotatably drivable differential housing (3);
   at least one driving gear wheel (5) associated with and arranged on the at least one driveshaft (4), so as to be fixed with respect to rotation relative to the driveshaft (4); and
   at least one driven gear wheel (7), the at least one driving gear wheel (5) meshingly engaging, by oppositely directed helical teeth, with the at least one driven gear wheel (7) to generate axial forces, and having at least one thrust bearing arrangement configured to support the axial forces, the at least one thrust bearing arrangement being in turn supported at a structural component part of the drive device,
   wherein:
   the differential bearings (2) are radial/axial rolling bearings with an inner ring (19) and an outer ring (20), the inner ring (19) being arranged at the rotatably drivable differential housing (3) and supported axially at a first radial supporting surface (17) of the rotatably drivable differential housing,
   the at least one thrust bearing arrangement is supported axially with respect to the at least one driveshaft (4) at a second supporting surface (24) on a side of the outer ring (20) facing the at least one driving gear wheel (5), and wherein the outer ring (20) of the differential bearing (2) is supported by its side remote of the rotatably drivable differential housing (3) axially at a third supporting surface (22) of the stationary housing (1),
   the at least one thrust bearing arrangement has an annular shaft disk (13), axially coupled to the driving gear wheel (5), and an annular housing disk (15), axially coupled to the second supporting surface (24) of the outer ring (20) of the differential bearing (2), the annular shaft disk (13) and annular housing disk (15) surrounding the at least one driveshaft (4), the annular housing disk (15) is axially guided in a cup-shaped recess (21) of the stationary housing (1), wherein a base of the cup-shaped recess (21) forms the third supporting surface (22), the cup-shaped recess (21) is a stepped recess whose diameter decreases in a stepped manner towards the base of the cup-shaped recess (21), and the annular housing disk (15) is formed in a stepped manner in its radially outer region to correspond to a shape of the base of the cup-shaped recess (21), and wherein an axial rolling bearing (14) is arranged axially between and contacting the annular shaft disk (13) and the annular housing disk (15), wherein the annular housing disk (15) extends radially outward past the axial rolling bearing (14), and the outer ring (20) of the differential bearing (2) is supported axially by the annular housing disk (15) at the third supporting surface (22) of the stationary housing (1).

2. The drive device according to claim 1, wherein the outer ring (20) of each differential bearing (2) axially contacts the annular housing disk (15) by its second supporting surface via a spacer disk (16) of determined thickness.

3. The drive device according to claim 1, wherein an axially pre-loaded first spring element is arranged between the at least one driving gear wheel (5) and the annular shaft disk (13).

4. The drive device according to claim 1, wherein the at least one driveshaft (4) is formed integrally with at least one driving gear wheel (5).

5. The drive device according to claim 3, wherein the at least one driving gear wheel (5) is loaded axially by a second spring element which is supported at the stationary housing (1).

6. The drive device according to claim 5, wherein the first spring element and/or the second spring element are/is a plate spring (9, 23).

* * * * *